United States Patent [19]

Arai et al.

[11] 4,387,435
[45] Jun. 7, 1983

[54] PICTURE PRINTING DEVICE

[75] Inventors: Yoshio Arai; Hiroyuki Kataoka; Yasumasa Moriya, all of Kanagawa, Japan

[73] Assignee: Fuji Xerox Co., Ltd., Tokyo, Japan

[21] Appl. No.: 182,727

[22] Filed: Aug. 29, 1980

[30] Foreign Application Priority Data

Sep. 3, 1979 [JP] Japan .................. 54-111693

[51] Int. Cl.³ .............................................. G06F 3/14
[52] U.S. Cl. .................................. 364/514; 340/723; 358/280; 382/41
[58] Field of Search ....................... 364/515, 518, 571; 358/183, 280; 340/723, 727

[56] References Cited

U.S. PATENT DOCUMENTS

| 3,780,223 | 12/1973 | Perry | 358/183 |
|---|---|---|---|
| 3,904,816 | 9/1975 | Taudt et al. | 358/280 |
| 4,143,401 | 3/1979 | Coviello | 364/515 |
| 4,183,056 | 1/1980 | Evans et al. | 358/183 |
| 4,257,044 | 3/1981 | Fukuoka | 358/280 |
| 4,271,476 | 6/1981 | Lotspiech | 364/515 |

Primary Examiner—Errol A. Krass
Attorney, Agent, or Firm—Sughrue, Mion, Zinn, Macpeak and Seas

[57] ABSTRACT

A picture printing device and method for printing pictures using a main scan and a sub scan. A first comparison means counts the number of picture elements in a main-scanning direction and compares that number with a first value preset in the first comparison means. A second comparison means counts the number of scanning lines in a sub-scanning direction and compares that number with a second value preset in the second comparison means. A printer records predetermined signals in response to combinations of the outputs of the first and second comparison means.

4 Claims, 6 Drawing Figures

PICTURE PRINTING DEVICE

SUMMARY OF THE INVENTION

The invention provides a picture printing device for printing pictures using a main scan and a sub scan in which predetermined picture position data is simultaneously printed at predetermined coordinate positions with respect to main-scanning and sub-scanning start reference points. A first comparison means counts the number of picture elements in a main-scanning direction and compares the number of picture elements thus counted with a first value preset in the first comparison means such as in a companion register. A second comparison means counts the number of scanning lines in a sub-scanning direction and compares the number of scanning lines thus counted with a second value preset in the second comparison means. A printer prints and records predetermined signals in response to combinations of outputs of the first and second comparison means.

Yet further, the invention provides a method for printing pictures and correcting the rotational and translational deviations of a printed picture including the steps of determining the number of picture elements $n_a$ between the intersection of an a-th scanning line and a reference line X and the intersection of a position data line $L_x$ on the original picture and the a-th scanning line and also the number of picture elements $n_b$ between the intersection of the phantom reference line X and an (a+N)-th scanning line and the intersection of the position data line $L_x$ and the (a+N)-th scanning line. The amount of rotational deviation between the original picture stand and the position data line on the original picture is then corrected in accordance with the formula $\phi = \tan^{-1}(n_a - n_b)/N$. Next, the translational deviations in the horizontal and vertical directions are corrected. The number of picture elements corresponding to the distance $N_x$ between the reference line X and the position data line $L_x$ are determined as well as the number of scanning lines corresponding to the distance $N_y$ between a reference line Y and the position data $L_y$ where the reference line Y and the position data line $L_y$ are perpendicular to the reference line X and the position data line $L_x$. The horizontal and vertical deviations are corrected in response to $N_x$ and $N_y$.

DESCRIPTION OF THE PREFERRED EMBODIMENTS

The present invention relates to an electronic picture image printing device which simultaneously prints picture data and symbols or marks to facilitate original picture position correction at the time of re-reading a picture.

Figure 1:
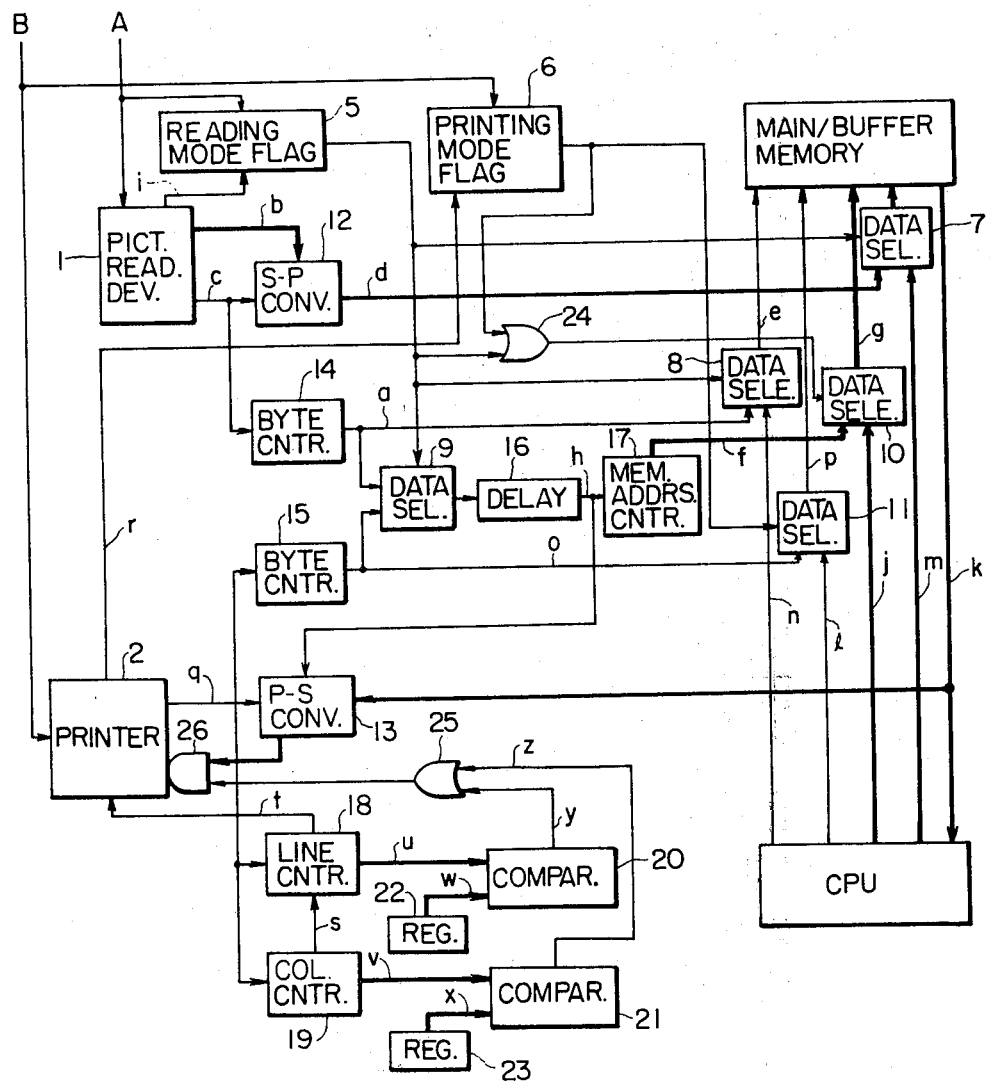
FIG. 1 is a block diagram of a picture printing device of the invention.

FIG. 1 is a block diagram showing a picture position data printing device constructed according to the invention. In FIG. 1, heavy lines indicate data lines and thin lines control lines. When the operator operates a start button to instruct the printing device to start reading an original picture, a start signal is applied to a terminal A. As a result, a reading signal is applied to a terminal A. As a result, a reading mode flip-flop or flag 5 is set and a picture reading device 1 starts a reading operation. At the start of this operation, a byte (word) counter 14 is reset and a memory address counter 17 is set to a predetermined address.

When the reading mode flag 5 is set, a data selector circuit 7 selects as its coupled-through input the input of a series-parallel converter circuit 12, the output of an OR circuit 24 is raised to a logic level "1", and a data selection circuit 10 selects as its coupled-through input the output of the memory address counter 17. Similarly, data selector circuits 8 and 9 select the carry output a of the byte (word) counter 14.

When the picture reading device 1 starts reading the original picture, a bit-serial digital signal b is applied to the series-parallel convertor circuit 12 and a synchronizing signal c for the digital signal b is outputted by the picture reading device 1. The synchronizing signal c operates to clock in the digital signal b and to cause the byte (word) counter 14 to count upward.

The number of bits in the byte (word) counter 14 corresponds to the word length of a main/buffer memory device 3. For instance, if the word length is 8 bits, then the number of bits of counter 14 is 3 bits, if the word length is 16 bits, then the number of bits is 4 bits, and if the word length is 32 bits, then the number of bits is 5 bits. In this case, for convenience in description, the word length of the memory device is described as being 8 bits, and accordingly the number of bits of the counter 14 is 3 bits. Thus, the parallel output d of the series-parallel conversion circuit 12 is 8 bits.

Whenever eight synchronizing signals c are received by the byte (word) counter 14, the counter 14 provides a carry output signal a. This signal a is coupled through the selection circuit 8 and is applied as a write request signal e at an address specified by the memory address counter 17 to the main/buffer memory device 3. The address data of the memory address counter 17 is applied through the selection circuit 10 to the main/buffer memory device 3. In this operation, the parallel output d of the series-parallel converter circuit 12 is applied, as the writing data, through the selector circuit 7 to the main/buffer memory device 3.

The carry output a coupled through the selection circuit 9 passes through a delay circuit 16 which delays the signal until a sufficient time has passed for the data to be written into the main/buffer memory device 3. Upon completion of the data writing operation, the carry output a appears as an addition enabling signal h which is applied to the memory address counter 17 as a result of which the content of the memory address counter 17 is changed by a value of one. The above-described operation is continued until the picture reading device 1 has completed the reading of the original picture.

When the picture reading device 1 has completed the reading of the original picture, the picture reading device 1 outputs an operation completion signal i which resets the reading mode flag 5 as a result of which the selector circuits 7, 8, 9 and 10 are placed in an initial state and the fact that the reading operation has been completed is indicated to a central processing unit 4.

Upon receipt of the reading completion signal, the central processing unit 4 starts its operation. The central processing unit 4 carried out various operations including data coding.

When reading data from the main/buffer memory device 3 is carried out by the central processing unit 4, a memory address j is applied through the selector circuit 10 to an address bus g and a read request signal l is applied through a selector circuit 11 to the main/buffer memory device 3. The read data is inputted through a data bus k to the central processing unit 4. In contrast, for writing data, write data m is applied through the selector circuit 7 to the main/buffer memory device 3 and a write request signal n is supplied through the selector circuit 8 to the main/buffer memory device 3.

In the preferred embodiment described, in the central processing unit, the address buses, the read data buses, and the write data buses are provided separately as shown in FIG. 1. However, in one example of a central processing unit which may be used with the invention, the read data buses and the write data buses are implemented as a single bi-directional bus. In another example, all of the buses including the address buses are implemented as a single bus. For convenience of description of the flows of data, the buses are described as being individually provided although other types of buses may be employed with the invention.

When a series of data processes such as a coding operation (as disclosed in Japanese Laid-Open Patent Application No. 31332/1980, for instance) is accomplished by the central processing unit 4, the operator depresses a print start button (not shown). In this case, the print start instructions may be executed directly by the central processing unit 4. A print start instruction signal B instructs a printer 2 to start printing and simultaneously sets a printing mode flag 6 whereupon the data selection circuit 11 selects the carry output o of a byte (word) counter 15. As controlled by the output of the OR circuit 24, the data selector circuit 10 selects the data f from the memory address counter 17.

In this operation, both a line counter 18 and a column counter 19 are reset and the memory address counter 17 is set to a predetermined memory address. Also, all the bits of the byte (word) counter 15 are set to "1" as a result of which the counter 15 generates a carry output o in the "1" state. The carry output is supplied to the selection circuit 11 which applies a read request signal p to the main/buffer memory device 3. The main/buffer memory device 3 causes the central processing unit to read the contents of the address specified by the memory address counter 17 and transmits the data thus read on the read data bus k.

The carry output of the byte (word) counter 15 passes through the data selector circuit 9 and is then delayed by the delay circuit 16 until the data read out of the main/buffer memory device 3 has stabilized. When the read data is stable, the delay circuit 16 provides the addition enable signal h which is applied to the memory address counter while the read data is loaded into a parallel-series converter circuit 13.

Upon the start of the printing operation, the printer 2 provides a data reading synchronous signal q and reads, in a bit-serial manner, the data from the parallel-series conversion circuit 13 through an AND circuit 26. The synchronous signal q is used as a clock signal for the byte (word) counter 15. Therefore, similarly to the above-described byte (word) counter 14, when eight pulses of the synchronous signal q have been provided, the byte (word) counter 15 provides the carry output o in the "1" state. Thus, until the printing operation has been completed, the printing operation is repeatedly carried out in accordance with the contents of the main/buffer memory device 3.

Upon completion of the printing operation, the printer 2 provides an operation completion signal r to reset the printing mode flag 6 as a result of which the selector circuits 10 and 11 are placed in the initial state and the central processing unit 4 is signalled that the operation has been completed.

The data reading synchronous signal q produced by the printer 2 during the printing operation is used as a clock signal to the line counter 18 and the column counter 19. The line counter 18 operates to count the number of scanning lines in the sub-scanning direction and the column counter 18 operates to count the number of picture elements in the main-scanning direction.

The carry output s of the column counter 19 is employed as a counter enable signal to the line counter 18 so that, whenever the printing of a line in the main-scanning direction has been completed, the count enable signal is activated. When the count in the sub-scanning direction has reached a predetermined value by repeating the above-described operations, the line counter 18 supplies an operation completion signal t to the printer 2.

The count outputs u and v of the line counter 18 and the column counter 19 are applied to comparison circuits 20 and 21, respectively. Fixed data w and x is stored in registers 22 and 23 in advance, respectively. The fixed data w and x thus stored is compared with the count outputs u and v by the comparison circuits 20 and 21, respectively.

Figure 2:
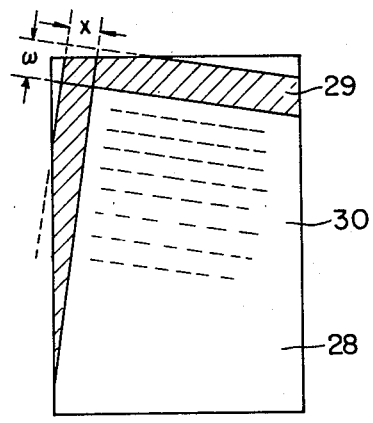
FIGS. 2 through 4 are plan views showing examples of a print output provided by the invention.

When $u > w$ is indicated as a comparison result by the comparison circuit 20, the comparison circuit 20 provides a comparison signal y. When $v > x$ is indicated as a comparison result by the comparison circuit 21, the comparison circuit 21 provides a comparison signal z. As controlled by the comparison signals y and z, an OR circuit 25 controls the AND circuit 26 to pass the bit-serial read data. By the operation of the OR circuit 25, a print output 28 having a position data portion 29 and a print data portion 30 as shown in FIG. 2 can be obtained.

Figure 3:
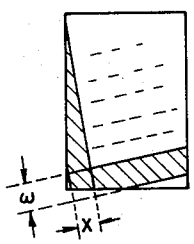
Figure 4:
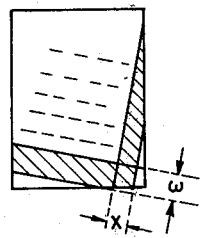

The above-described fixed data w and w may be freely set by the central processing unit 4 or may be set through an operating panel by the operator. If the count output u is exchanged for the fixed data w and the value w is set, then a print output as shown in FIG. 3 can be obtained. Similarly, if the count output v is exchanged for the fixed data x, and the value x is set, then a print output as shown in FIG. 4 can be obtained.

Figure 5:
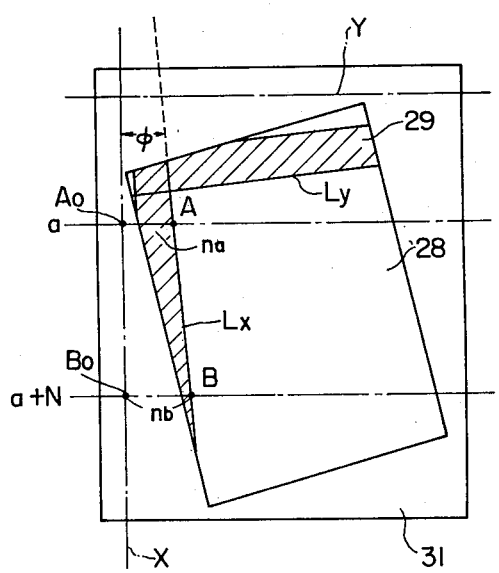
FIGS. 5 and 6 are diagrams for a description of a method of correcting the position of the print output shown in FIG. 2.

A position correcting method used for re-reading a print output will be described with reference to FIGS. 5 and 6. When re-reading an original picture, the above-described print output 28 is placed on an original picture stand 31 with a deviation $\phi$ in the rotational direction, in general, as shown in FIG. 5. This deviation must be corrected. To accomplish this, first the number of picture elements $n_a$ between the intersection $A_0$ of an a-th scanning line and a phantom reference line X and the intersection A of a position data line $L_x$ on the original picture 28 and the a-th scanning line is measured. Similarly, the number of picture elements $n_b$ between the intersection $B_0$ of the phantom reference line X and an (a+N)-th scanning line and the intersection B of the position data line $L_x$ and the (a+N)-th scanning line is measured. Then, the amount of rotational deviation $\phi$ between the original picture stand 31 and the position data line $L_x$ on the original picture 28 can be obtained from the following equation using the two measured results:

$$\phi = \tan^{-1}(n_a - n_b)/N.$$

The angular deviation can be corrected using the value $\phi$.

Figure 6:
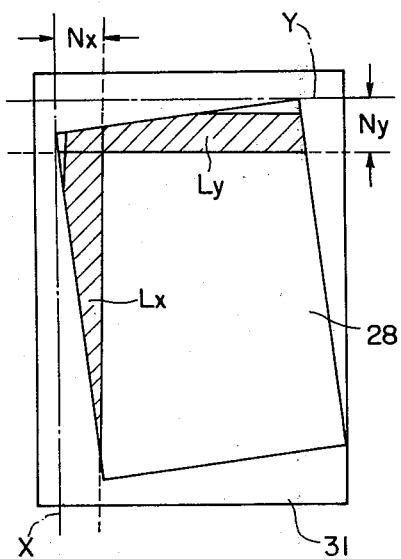

Upon completion of this correction, the result is shown in FIG. 6. However, deviations in horizontal and vertical directions still remain which must be corrected. The deviations can be readily corrected by detecting the number of picture elements corresponding to the distance or shift $N_x$ between the phantom reference line X on the original picture placing stand 31 and the position data line $L_x$ on the original picture 28 and by detecting the number of scanning lines corresponding to the distance or shift $N_y$ between the phantom reference line Y and the position data line $L_y$.

By correcting both the deviation in rotation and in horizontal position, the phantom reference lines X and Y on the original picture stand 31 can be made to coincide with the position data lines $L_x$ and $L_y$ on the original picture 28.

As is clear from the above description, according to the invention, in reading and recording a picture the data which is employed for referring the position of the picture can also be recorded and printed. Therefore, in re-reading the print output, positioning the original picture can be readily achieved with a high accuracy and can be automatically accomplished. It is obvious that the position data is not limited to those described above. That is, the position data may be straight lines, segments, points, or other marks.

What is claimed is:

1. A picture printing device for printing pictures using a main scan and a sub scan and in which predetermined picture position data is simultaneously printed at predetermined coordinate positions with respect to main-scanning and sub-scanning start reference points comprising: first comparison means for counting a number of picture elements in a main-scanning direction and comparing said number of picture elements thus counted with a first value preset in said first comparison means; second comparison means for counting the number of scanning lines in a sub-scanning direction and comparing said number of scanning lines thus counted with a second value preset in said second comparison means; means for printing and recording predetermined signals in response to combinations of outputs of said first comparison means and said second comparison means wherein the printing of said predetermined signals is accompanied by said predetermined picture position data, and means for utilizing said predetermined picture position data to correct the alignment of a re-read print output with respect to the horizontal and vertical axes of a recording medium.

2. A picture printing device for printing pictures using a main scan and a sub scan and in which predetermined picture position data is simultaneously printed at predetermined coordinate positions with respect to main-scanning and sub-scanning start reference points comprising: a picture reading device producing a serial output signal representing a read picture, said picture reading device starting operation in response to a read start signal, and said picture reading device producing an operation complete signal and an output synchronization signal; a reading mode flag flip-flop, said reading mode flag flip-flop being set to a first state by said read start signal and a second state by said operation complete signal; a series-to-parallel converter receiving said serial output signal from said picture reading device as a data input signal, said series-to-parallel converter operating in response to said output synchronization signal produced by said picture reading device; a first byte counter operatively coupled to count in response to said output synchronization signal from said picture reading device; a printer, said printer starting operation in response to a print start signal, said printer producing an operation complete signal and a data reading synchronization signal; a second byte counter operatively coupled to count in response to said data reading synchronization signal produced by said printer; a first data selector, a carry output of said first byte counter being coupled to a first input of said first data selector and a carry output of said second byte counter being coupled to a second input of said first data selector, said first data selector operating in response to an output of said reading mode flag flip-flop; a printing mode flag flip-flop, said printing mode flag flip-flop being set to a first state by said print start signal and to a second state by said operation completion signal produced by said printer; a first OR gate having a first input coupled to an output of said printing mode flag flip-flop and a second input coupled to said output of said reading mode flag flip-flop; a delay circuit having an input coupled to an output of said first data selector; a memory address counter operatively coupled to count in response to an output of said delay circuit; a central processing unit, said central processing unit having a read data bus, a write data bus, and a memory address bus, said central processing unit producing a write request signal and a read request signal; a second data selector having a first input coupled to said output of said second byte counter and a second input coupled to said read request signal produced by said central processing unit, said data selector operating in response to said output of said printing mode flag flip-flop; a third data selector having a first input coupled to said output of said first byte counter and a second input coupled to said write request signal produced by said central processing unit, said third data selector operating in response to said output of said reading mode flag flip-flop; a fourth data selector having a first input port coupled to count outputs of said memory address counter and a second input port coupled to said memory address bus of said central processing unit, said fourth data selector operating in response to an output of said first OR gate; a fifth data selector having a first input port coupled to outputs of said series-to-parallel converter and a second input port coupled to said write data bus of said central processing unit, said fifth data selector operating in response to said output of said reading mode flag flip-flop; a main buffer memory having an address input port coupled to an output port of said fourth data selector, a data input port coupled to an output port of said fifth data selector, a write request input coupled to an output of said third data selector, a read request input coupled to an output of said second data selector, and an output data port coupled to said read data bus of said central processing unit; a parallel-to-series converter having a data input port coupled to said read data bus of said central processing unit, said parallel-to-series converter operating in response to said output of said delay circuit and said data reading synchronization signal produced by said printer; a set of AND gates having first inputs coupled to corresponding outputs of said parallel-to-series converter and outputs coupled to data inputs of said printer; a column counter operatively coupled to count in response to said data reading synchronization signal produced by said printer, a first register for storing a first fixed digital number; a first comparator having a first input port coupled to an output port of said line counter and a second input port coupled to outputs of said first register; a line counter operatively coupled to count in response to a carry output of said column counter, said line counter producing a carry output signal coupled as an operation completion signal to said printer; a second register for storing a second fixed digital number; a second comparator having a first input port coupled to outputs of said line counter and a second input port coupled to outputs of said second register; and a second OR gate having a first input coupled to a comparison output of said first comparator and a second input coupled to a comparison output of said second comparator, an output of said second OR gate being coupled to inputs of said AND gates.

3. A method for correcting the position of a re-read print output comprising the steps of: determining the number of picture elements $n_a$ between the intersection of an a-th scanning line and a reference line, and the intersection of a position data line and said a-th scanning line; determining the number of picture elements $n_b$ between the intersection of said reference line and a (a+N)-th scanning line and the intersection of said position data line and said (a+N)-th scanning line; determining the amount of rotational deviation $\phi$ between an original picture stand and said position data line in accordance with $\phi = \tan^{-1}(n_a - n_b)/N$; correcting the angular deviation of said picture in accordance with the value $\phi$; determining the number of picture elements corresponding to the distance between said reference line and said position data line; determining the number of scanning lines corresponding to the distance between a second reference line perpendicular to the first-mentioned reference line and a position data line perpendicular to the first-mentioned position data line; and correcting horizontal and vertical deviations in response to the determined number of picture elements corresponding to the distance between said first-mentioned reference line and said first-mentioned data line and said second-mentioned reference line and said second-mentioned position data line, respectively.

4. The picture printing device of claim 2, further including means for utilizing said predetermined picture position data to correct the alignment of a re-read print output with respect to the horizontal and vertical axes of a recording medium.

* * * * *